(12) United States Patent
Takeshita

(10) Patent No.: US 6,556,524 B1
(45) Date of Patent: Apr. 29, 2003

(54) OPTIMUM-RECORDING-SPEED DETERMINING METHOD, RECORDING-SPEED SETTING METHOD AND RECORDING METHOD FOR OPTICAL DISK

(75) Inventor: Kenichiro Takeshita, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/650,318

(22) Filed: Aug. 29, 2000

(30) Foreign Application Priority Data

Aug. 31, 1999 (JP) .......................................... 11-244850

(51) Int. Cl.⁷ ................................................ G11B 7/00
(52) U.S. Cl. ................................ 369/47.43; 369/47.36; 369/47.5; 369/53.11
(58) Field of Search ........................... 369/47.1, 47.12, 369/47.13, 47.25, 47.28, 47.36, 47.4, 47.41, 47.5, 47.55, 53.1, 53.11, 53.37, 53.45, 59.1, 59.11, 116

(56) References Cited

U.S. PATENT DOCUMENTS 5,398,227 A * 3/1995 Miyaoka et al. ............ 369/116
5,862,103 A * 1/1999 Matsumoto et al. ..... 369/116 X
6,115,338 A * 9/2000 Masaki et al. ........... 369/47.52

FOREIGN PATENT DOCUMENTS

| EP | 0642128 A1 | 3/1995 |
| EP | 0986055 A1 | 3/2000 |
| JP | 9-198660 | 7/1997 |
| JP | 9-288827 | 11/1997 |
| JP | 10-293961 | 11/1998 |
| JP | 11-66562 | 3/1999 |
| JP | 2000-163746 | 6/2000 |
| JP | 2000-163751 | 6/2000 |

* cited by examiner

Primary Examiner—Muhammad Edun
(74) Attorney, Agent, or Firm—Pillsbury Winthrop LLP (57) ABSTRACT

Optimum power control also known as OPC is performed while changing a recording speed and a recording laser power level. Signal recorded through the optimum power control is reproduced for measurement of reproduced signal quality. Recording speed achieving a recording laser power level that can provide reproduced signal quality falling within a predetermined acceptable range is displayed as a recommendable recording speed so that a user can set the displayed speed as a recording speed for use in actual recording.

32 Claims, 5 Drawing Sheets

INITIAL
DISPLAY

FIG. 5A

DISPLAY AFTER
SYSTEM – DEPENDENT
OPTIMUM RECORDING
SPEED DETERMINING
TEST

FIG. 5B

DISPLAY AFTER
MEDIA – DEPENDENT
OPTIMUM RECORDING
SPEED DETERMINING
TEST

FIG. 5C

CHANGE OF
RECORDING SPEED
SETTING

FIG. 5D (◉: USER – SELECTED RECORDING SPEED)

OPTIMUM-RECORDING-SPEED DETERMINING METHOD, RECORDING-SPEED SETTING METHOD AND RECORDING METHOD FOR OPTICAL DISK

BACKGROUND OF THE INVENTION

The present invention relates to an optimum-recording-speed determining method for determining whether or not a given recording speed to be used for optical disk recording achieves appropriate recording that permits reproduction of recorded information with minimized reading errors or which recording speed permits reproduction of recorded information with minimized reading errors, and a recording-speed setting method and optical disk recording method based on such an optimum-recording-speed determination.

Today, recording on writable optical disks, such as write-once optical disks like CD-R and DVD-R media and rewritable optical disks like DVD+RW and DVD-RW media, is performed at increased speeds relative to a normal (non-increased or one-time) reproducing speed, such as a double speed, quadruple speed and the like, with a view to reducing a necessary recording time.

For appropriate optical disk recording that permits subsequent reproduction of recorded information with minimized reading errors, it has been conventional to change the so-called "recording strategy" such as by adjusting a power level, irradiation time, irradiation timing, etc. of a recording laser light beam in accordance with a selected one of the recording speed increase ratios.

Recently, it has been found that as the recording speed increase ratio is raised, appropriate recording tends to become more difficult to achieve by just changing the recording strategy (e.g., adjusting the power level, irradiation time, irradiation timing, etc. of the recording laser light beam), even with a same type of media (optical disks), depending on the manufacturer of the media, and thus there would be manufactured media prone to frequently cause reading errors. Consequently, it has been found that even recording speeds, settable in a recording drive (i.e., optical disk recording apparatus), have to be properly restricted depending on the media used.

SUMMARY OF THE INVENTION

In view of the foregoing, it is an object of the present invention to provide an optimum-recording-speed determining method for determining whether or not a recording speed to be used for optical disk recording achieves appropriate recording that permits reproduction of recorded information with minimized reading errors or which recording speed permits reproduction of recorded information with minimized reading errors, and an improved recording-speed setting method and optical disk recording method based on such an optimum-recording-speed determination.

According to an aspect of the present invention, there is provided a method of determining an optimum recording speed of an optical disk, which comprises the steps of: performing test recording on the optical disk at a given recording speed while changing a recording laser power level, and reproducing results of the test recording from the optical disk; measuring parameter values pertaining to reproduced signal quality on the basis of the reproduced results; and determining, on the basis of the parameter values, whether there is achieved any laser power level that can provide reproduced signal quality falling within a predetermined acceptable range, When it is determined that there is achieved the laser power level that can provide reproduced signal quality falling within the predetermined acceptable range, the given recording speed is judged as a proper recording speed, while when it is determined that there is achieved no laser power level that can provide reproduced signal quality falling within the predetermined acceptable range, the given recording speed is judged as an improper recording speed. With such arrangements, a determination can be made as to whether or not the recording speed to be used provides for appropriate recording that permits reproduction of recorded information with minimized reading errors.

According to another aspect of the present invention, there is provided a method of determining an optimum recording speed of an optical disk, which comprises the steps of: performing test recording on the optical disk while changing a recording speed and a recording laser power level, and reproducing results of the test recording from the optical disk; measuring parameter values pertaining to reproduced signal quality on the basis of the reproduced results; and determining, on the basis of the parameter values, whether there is achieved any laser power level that can provide reproduced signal quality falling within a predetermined acceptable range. Recording speed achieving the laser power level that can provide reproduced signal quality falling within the predetermined acceptable range is judged as a proper recording speed, while another recording speed achieving no laser power level that can provide reproduced signal quality falling within the predetermined acceptable range is judged as an improper recording speed.

The above-mentioned parameter values pertaining to reproduced signal quality may include at least parameter values relating to the total number of synchronization signals detected within a predetermined time period and a ratio between top and bottom peaks of a reproduced HF signal. Here, a recording speed achieving a laser power level that allows both of the parameter values relating to the total number of detected synchronization signals and the ratio between top and bottom peaks to fall within respective acceptable ranges may be judged as a proper recording speed. Results of the judgement may be displayed visually. Even at a recording speed which allows the optical disk recording apparatus to perform appropriate recording that permits reproduction of recorded information with minimized reading errors, a buffer memory within the recording apparatus, during actual recording, would cause a buffer underrun condition, i.e., run out of data, if a host computer, such as a personal computer, has low processing capabilities and can only transmit recording data at a low rate, with the result that the optical disk recording apparatus fails in the recording. To avoid such inconveniences, it is preferred that the optimum recording-speed determining method of the invention further comprise the steps of: causing the recording data to be transferred from a host computer to an optical disk recording apparatus so that the optical disk recording apparatus records the recording data onto the optical disk with a reproducing laser power level while changing the recording speed within a recording speed range settable in the optical disk recording apparatus; determining whether the buffer memory of the optical disk recording apparatus will cause buffer underrun during recording of the recording data, to thereby identify one or more recording speeds that can avoid the buffer underrun; and then performing the test recording by use of one of the recording speeds that can avoid the buffer underrun.

According to still another aspect of the present invention, there is provided a method of setting a recording speed of an optical disk, in which one or more recording speeds judged as proper through any one of the above-described speed determining methods is displayed in such a manner that one of the displayed recording speeds can be set for use in actual recording on the basis of a speed designating operation by a user.

According to still another aspect of the present invention, there is provided a method of setting a recording speed of an optical disk, in which one or more recording speeds judged as proper through any one of the speed determining methods is stored onto a predetermined area of the optical disk, and in which as the optical disk is re-loaded into the optical disk recording apparatus, information indicative of the recording speeds judged as proper is read out from the predetermined area and displayed in such a manner that one of the displayed recording speeds can be set for use in actual recording on the basis of a speed designating operation by a user without a need for performing the test recording again. Thus, for an optical disk for which the optimum recording speed determination has been performed once, the optimum recording speed can be known without having to perform the optimum recording speed determination again, with the result that a time necessary for making preparations for actual recording can be reduced to a significant degree.

According to still another aspect of the present invention, there is provided a method of setting a recording speed of an optical disk, which comprises: a step of performing test recording on the optical disk with a recording speed initially set to a maximum available speed while changing a recording laser power level, and reproducing results of the test recording from the optical disk; a step of measuring parameter values pertaining to reproduced signal quality on the basis of the reproduced results; a step of, when there is achieved a recording laser power level that can provide reproduced signal quality higher than a predetermined value, terminating the test recording at the recording speed, but when there is achieved no recording laser power level that can provide reproduced signal quality higher than the predetermined value, performing the test recording while sequentially lowering the recording speed and terminating the test recording at a recording speed that can provide reproduced signal quality higher than the predetermined value; and a step of displaying, as a recommendable or settable recording speed, each recording speed having been used at the time of termination of the test recording in such a manner that the displayed recording speed can be set for use in actual recording. In this invention, the recording can be performed at a highest one of such recording speeds that provide for appropriate recording capable of minimizing reading errors during reproduction of recorded information. This recording-speed setting method may further comprise the steps of: causing recording data to be transferred from a host computer to an optical disk recording apparatus so that the optical disk recording apparatus records the recording data onto the optical disk with a reproducing laser power level while changing a recording speed within a recording speed range settable in the optical disk recording apparatus; determining whether a buffer memory of the optical disk recording apparatus will cause buffer underrun during recording of the recording data, to thereby identify one or more recording speeds that can avoid the buffer underrun; and setting a highest one of the one or more recording speeds as the maximum available speed for performing the test recording. With such arrangements, the present invention can effectively avoid needlessly or wastefully performing the test recording for recording speeds that would cause the buffer underrun problem. Further, a warning may be displayed when it has been determined, as a result of the test recording at the maximum available speed, that there is achieved no recording laser power level that can provide reproduced signal quality higher than the predetermined value, so that the user can be informed that no recording is permitted at that the maximum available speed.

According to still another aspect of the present invention, there is provided a method of setting a recording speed of an optical disk, which comprises: a step of performing test recording on the optical disk with a recording speed initially set to a desired speed designated by a user operation while changing a recording laser power level, and reproducing results of the test recording from the optical disk; a step of measuring parameter values pertaining to reproduced signal quality on the basis of the reproduced results; a step of, when there is achieved a recording laser power level that can provide reproduced signal quality higher than a predetermined value, terminating the test recording at the recording speed, but when there is achieved no recording laser power level that can provide reproduced signal quality higher than the predetermined value, performing the test recording while sequentially lowering the recording speed and terminating the test recording at a recording speed that can provide reproduced signal quality higher than the predetermined value; and a step of displaying, as a recommendable or settable recording speed, each recording speed having been used at the time of termination of the test recording in such a manner that the displayed recording speed can be set for use in actual recording. With such arrangements, the recording can be performed at a highest one of the recording speeds within the user-designated speed range that provide for appropriate recording capable of minimizing reading errors during reproduction of recorded information. This recording-speed setting method too may further comprise the steps of: causing recording data to be transferred from a host computer to an optical disk recording apparatus so that the optical disk recording apparatus records the recording data onto the optical disk with a reproducing laser power level while changing a recording speed within a recording speed range settable in the optical disk recording apparatus; and determining whether a buffer memory of the optical disk recording apparatus will cause buffer underrun during recording of the recording data, to thereby identify one or more recording speeds that can avoid the buffer underrun. In this invention, the user is allowed to designate an initial recording speed for the test recording from among the recording speeds that can avoid the buffer underrun. With such arrangements, the present invention can effectively avoid needlessly or wastefully performing the test recording for recording speeds that would cause the buffer underrun problem. Further, a warning may be displayed when it has been determined, as a result of the test recording at the user-designated speed, that there is achieved no recording laser power level that can provide reproduced signal quality higher than the predetermined value, so as to inform the user that no recording is permitted at that the maximum available speed and thereby prompt the user to change the setting of the recording speed.

According to still another aspect of the present invention, there is provided an optical disk recording method, in which actual recording is performed on an optical disk at a recording speed that has been set for use in the actual recording through any one of the above-described recording speed setting methods, by, on the basis of the test recording, setting the recording laser power level to a value with which there has been provided reproduced signal quality within the predetermined acceptable range. Such arrangements, recording can be performed on the optical disk at a high speed in such a manner as to minimize reading errors.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

Figure 1:
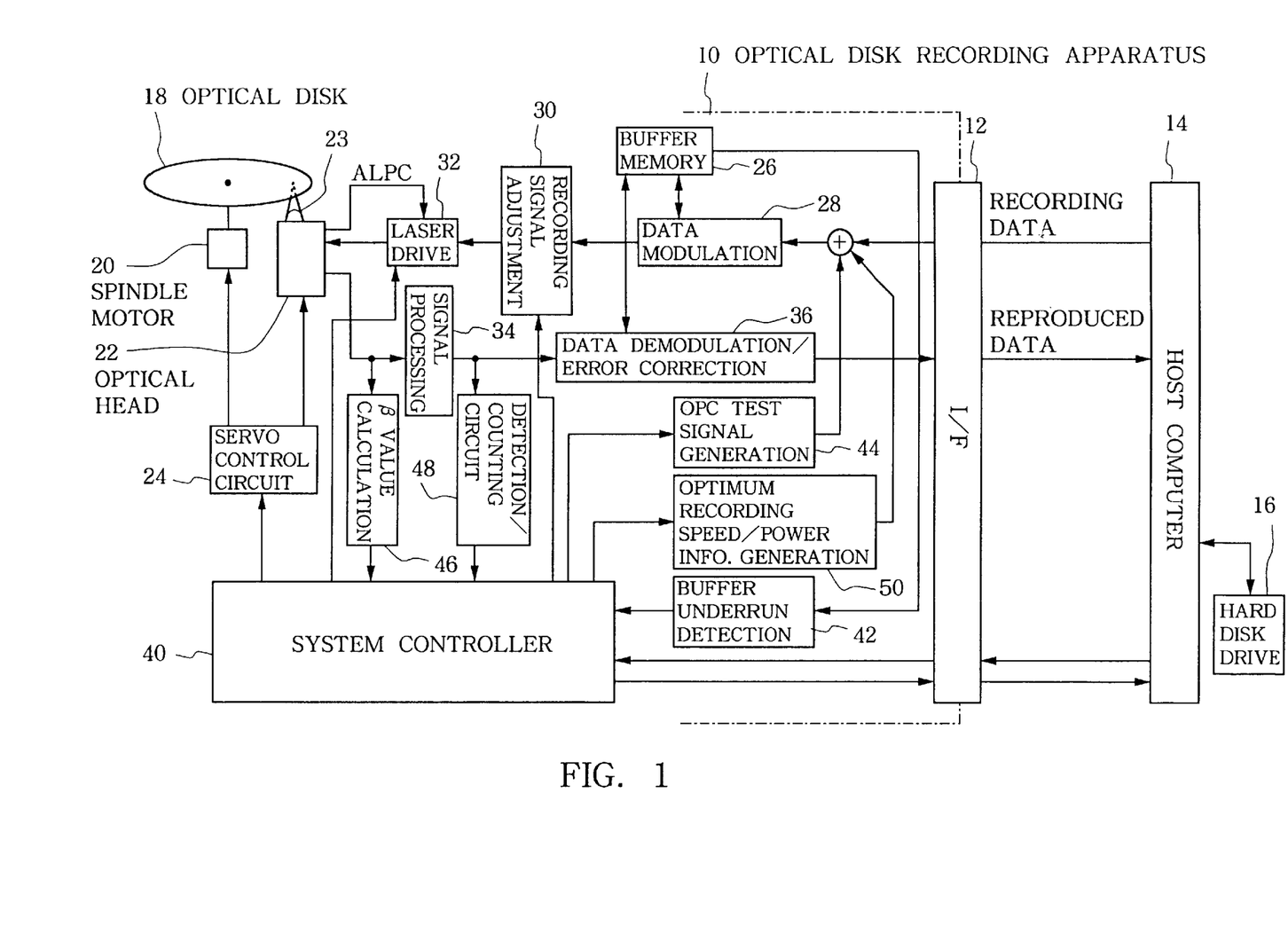
FIG. 1 is a block diagram showing an exemplary organization of a system for recording and reproducing desired information to and from an optical disk by use of an optical disk recording apparatus in accordance with a preferred embodiment of the present invention, as well as an inner structure of the optical disk recording apparatus.

FIG. 1 is a block diagram showing an exemplary organization of a system for recording and reproducing desired information to and from an optical disk by use of an optical disk recording apparatus in accordance with a preferred embodiment of the present invention, as well as an inner structure of the optical disk recording apparatus. The optical disk recording apparatus 10 includes a CD–R/CD–RW drive capable of recording and reproduction on CD–R and CD–RW disks. The optical disk recording apparatus 10 is connected via an interface (I/F) circuit 12 to a host computer 14 such as a personal computer. Hard disk drive 10 has stored therein data to be recorded by the optical disk recording apparatus 10.

Optical disk 18 for use in the optical disk recording apparatus 10 is a CD–R, CD–RW disk or the like, which is driven to rotate via a spindle motor 20 so that designated information can be recorded and reproduced (read out) to and from the optical disk 18 by means of a laser light beam emitted from an optical head 22. Servo control circuit 24 performs rotation speed control of the spindle motor 20, and tracking control, focusing control and feeding control of the optical head 22. In recording, the rotation speed of the spindle motor 20 is controlled in accordance with a recording speed increase ratio selected by a user via the host computer 14.

During recording, recording data, read out from the hard disk drive 16 and sent out from the host computer 14 at its own data transfer rate, are input to the optical disk recording apparatus 10. In the optical disk recording apparatus 10, the input recording data are temporarily stored into a buffer memory (RAM) 26 and then read out from the buffer memory 26 at a speed corresponding to the user-selected recording speed increase ratio. Then, the read-out data are subjected to an EFM (Eight to Fourteen Modulation) operation by a data modulation circuit 28, and then passed to a recording signal adjustment circuit 30 where time axial characteristics of the data, such as irradiation time and irradiation timing of the laser light beam based on a recording strategy, are adjusted as appropriate. Laser drive circuit 32 modulates the laser light beam 23, emitted from the optical head 22, with the recording signals, so as to form pits in the recording layer of the optical head 18 for recording of information. Power level of the laser light beam 23 is precisely controlled, in accordance with an ALPC (Automatic Laser Power Control) detection output, to assume a designated level.

In reproduction, each signal read out from the optical disk 18 via the optical head 22 is binary-coded by a signal processing circuit 34 and then delivered to a data demodulation/error correction circuit 36 for demodulation from the EFM format and correction of possible errors. Each output signal from the demodulation/error correction circuit 36 is transferred to the host computer 14 via the interface (I/F) circuit 12. System controller 40 controls the entire optical disk recording apparatus 10.

Prior to actual recording onto the optical disk 18, the optical disk recording apparatus 10 carries out tests, in response to instructions from the host computer 14, for determining an optimum recording speed and optimum recording laser power level. Optimum recording speed is determined here which satisfies following two requirements: 1) that the speed should allow the buffer memory to provide for appropriate recording without causing undesired "buffer underrun" in light of the data transfer rate of the host computer 14 (i.e., requirement as a "system-dependent optimum recording speed"); and 2) that the speed should achieve appropriate recording capable of minimizing reading errors during reproduction of recorded information (i.e., requirement as a "media-dependent optimum recording speed").

Figure 2:
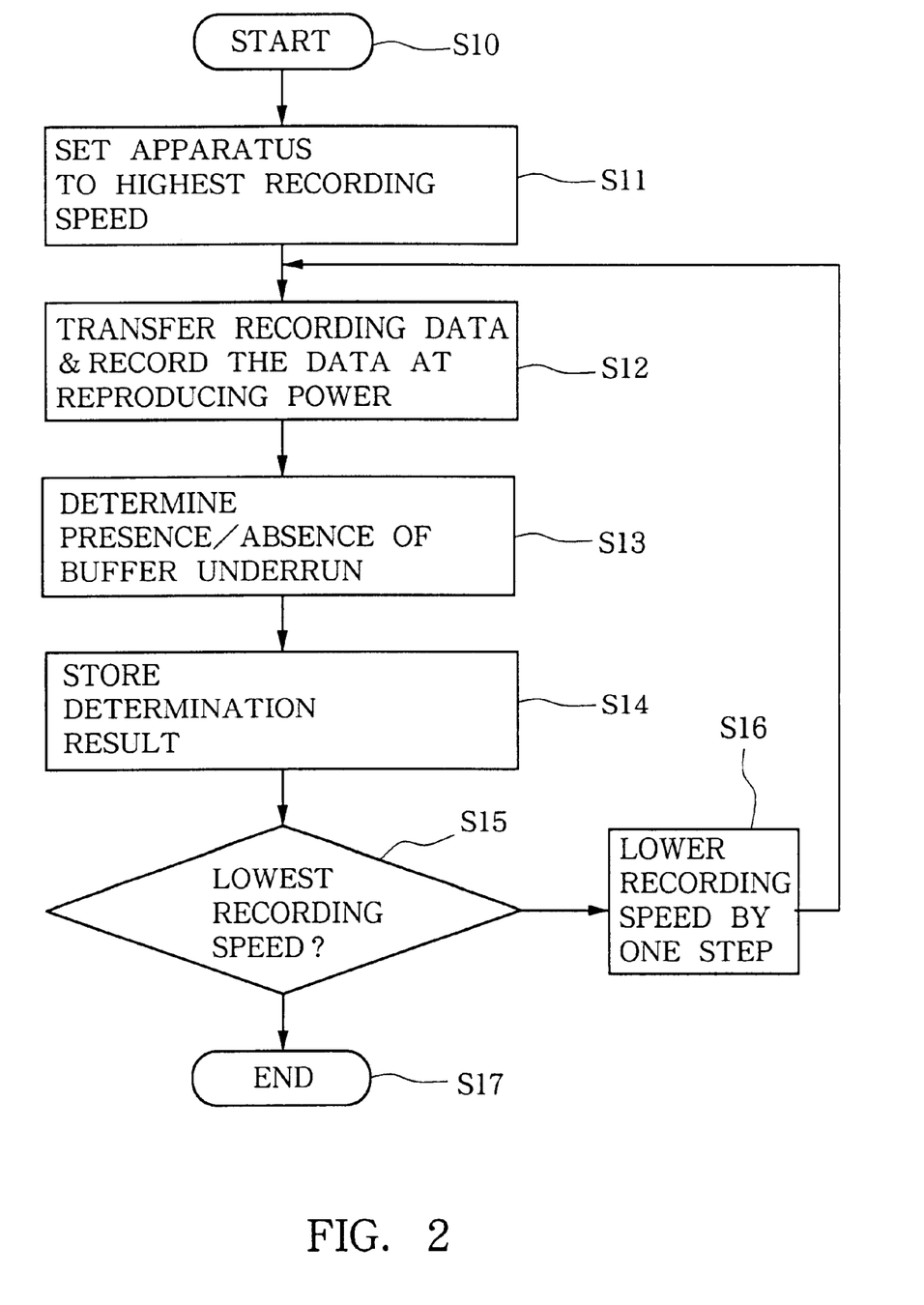
FIG. 2 is a flow chart showing an exemplary sequence of operations performed in a system-dependent optimum recording speed determining test by the system of FIG. 1.

The test for determining the system-dependent optimum recording speed (hereinafter called a "system-dependent optimum recording speed determining test") is carried out as follows. When the optical disk 18 is loaded into the optical disk recording apparatus 10 for the first time after the apparatus 10 is connected to the host computer 14, the system-dependent optimum recording speed determining test is automatically initiated in response to an instruction from the host computer 14 based on a user's operation. In FIG. 2, there is shown an exemplary sequence of operations performed in the system-dependent optimum recording speed determining test. Upon start of the system-dependent optimum recording speed determining test (step S10), the host computer 14 sets the optical disk recording apparatus 10 to a highest recording speed available or settable in the recording apparatus 10, at step S11. Then, at step S12, the host computer 14 reads out designated recording data from the hard disk drive 16, transfers the read-out recording data to the optical disk recording apparatus 10 at its own data transfer rate, and then causes the recording apparatus 10 to record the transferred data for a predetermined time period with a predetermined reproducing (not recording) laser power level; that is, because the reproducing laser power level is used, no data is actually recorded onto the optical disk 18 at this step. At that time, a buffer underrun detection circuit 42 of FIG. 1 constantly detects a quantity of data being currently stored in the buffer memory 26 so as to determine presence/absence of "buffer underrun", at step S13. If the data transfer speed of the host computer 14 is higher than the recording speed of the optical disk recording apparatus 10, there will occur no buffer underrun, but if the data transfer speed of the host computer 14 is lower than the recording speed of the recording apparatus 10, there will occur such buffer underrun. Determination result of the buffer underrun detection circuit 42 is stored into the host computer 14 at step S14. After that, the above-mentioned test operations are repeated after lowering the recording speed by one step or level at step S16 by way of step S15. Then, once all the test operations have been completed up to a lowest recording speed settable in the optical disk recording apparatus 10, the system-dependent optimum recording speed determining test is brought to an end at step S17 by way of step S15. Through the above-mentioned operations, the determination results as to the presence/absence of the buffer underrun are stored into the host computer 14 for all the recording speeds settable in the optical disk recording apparatus 10. Note that when one of the settable recording speeds which causes no buffer underrun has been found for the first time through the above-mentioned operations, all the remaining settable recording speeds may be judged as causing no buffer underrun and then the optimum recording speed determining test may be terminated immediately. It should also be appreciated that this system-dependent optimum recording speed determining test need to be conducted only once when the instant system is organized into an operable condition for the first time. After that, the same determination results stored in the host computer 14 can be used repetitively unless the system organization is changed.

Figure 3:
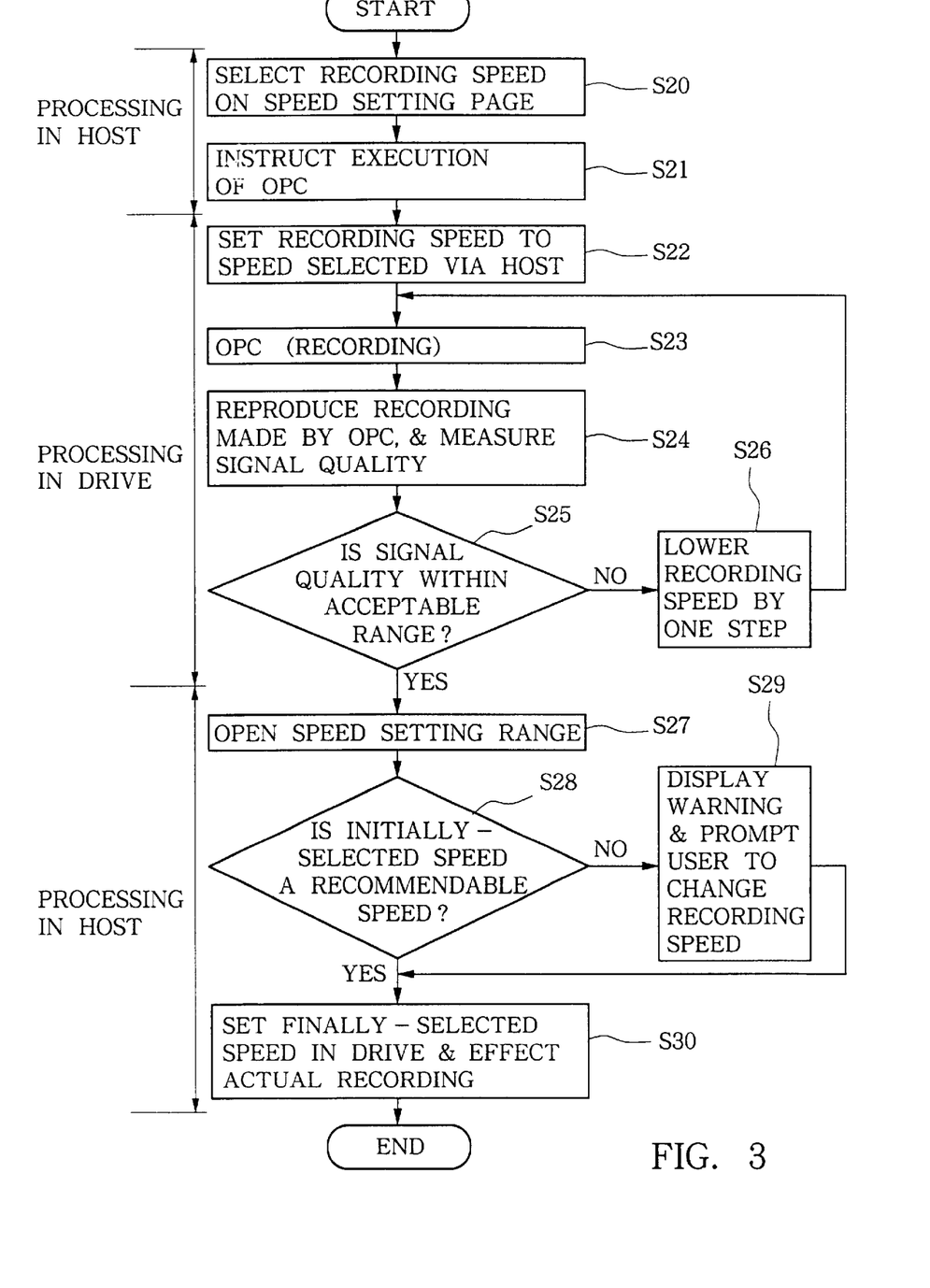
FIG. 3 is a flow chart showing an exemplary sequence of operations performed in a media-dependent optimum recording speed determining test by the system of FIG. 1.

In FIG. 3, there is shown an exemplary sequence of operations performed in the media-dependent optimum recording speed determining test. This media-dependent optimum recording speed determining test is also used for determining an optimum recording laser power level. When the optical disk 18 is loaded into the optical disk recording apparatus 10 with the system-dependent optimum recording speed determining test already completed in the aforesaid manner, a predetermined speed setting page is opened on a display of the host computer 14 so that the user can select or enter a desired recording speed on the page, at step S20; in this case, the user can select either a maximum value or a specific desired value of the recording speed. When the maximum value has been entered by the user, a highest one of the recording speeds, which have been judged as causing no buffer underrun through the above-described system-dependent optimum recording speed determining test, is set automatically. Various examples of the speed setting page shown on the display when a specific desired value of the recording speed has been selected by the user are illustrated in FIGS. 5A–5D. Specifically, FIGS. 5A–5D illustrate various examples of the speed setting page in the case where the recording speeds settable in the optical disk recording apparatus 10 are normal (one-time), double, quadruple, four-times, six-times, eight-times and ten-times speeds. Note that the maximum recording speed settable by the optical disk recording apparatus 10 may differ depending on the type (such as the CD–R, CD–RW or the like) of the optical disk 18 used; in such a case, the recording apparatus 10 identifies the type of the loaded optical disk 18 from ATIP (Absolute Time In-Pregroove) information recorded thereon and displays a listing of the settable recording speeds for the identified disk type.

Figure 5A:
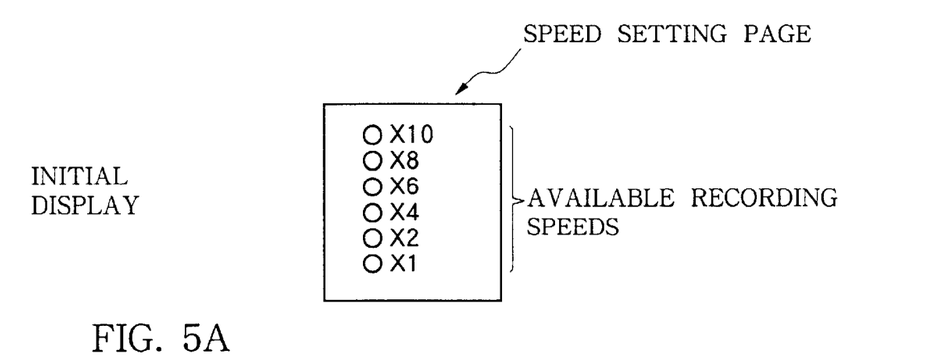
FIGS. 5A–5D are diagram showing various examples of speed setting pages shown on a display of a host computer of FIG. 1.
Figure 5B:
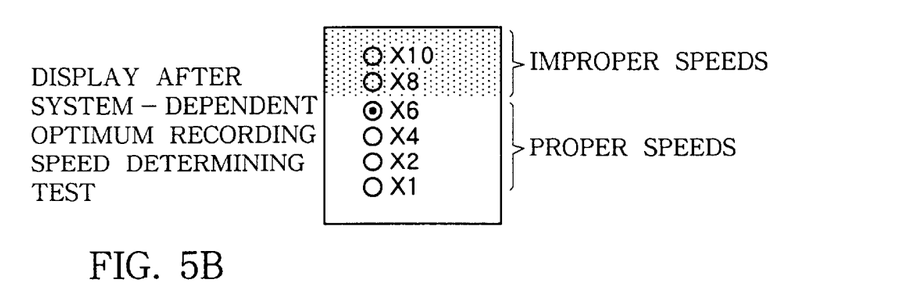

When all the recording speeds displayed on the speed setting page have been judged as achieving appropriate recording without causing the buffer underrun as a result of the above-described system-dependent optimum recording speed determining test, the speed setting page is displayed initially in the manner as shown in FIG. 5A, via which all the recording speeds can be selected by the user. FIG. 5B shows another speed setting page displayed when the eight-times and ten-times recording speeds have been judged improper as causing the buffer underrun through the system-dependent optimum recording speed determining test, and thus in this case, the recording speeds not higher than the six-times recording speed can be selected by the user as proper speeds; more specifically, in the example of FIG. 5B, the six-times recording speed has been selected by the user, as denoted by a black dot within a small white circle.

Figure 4:
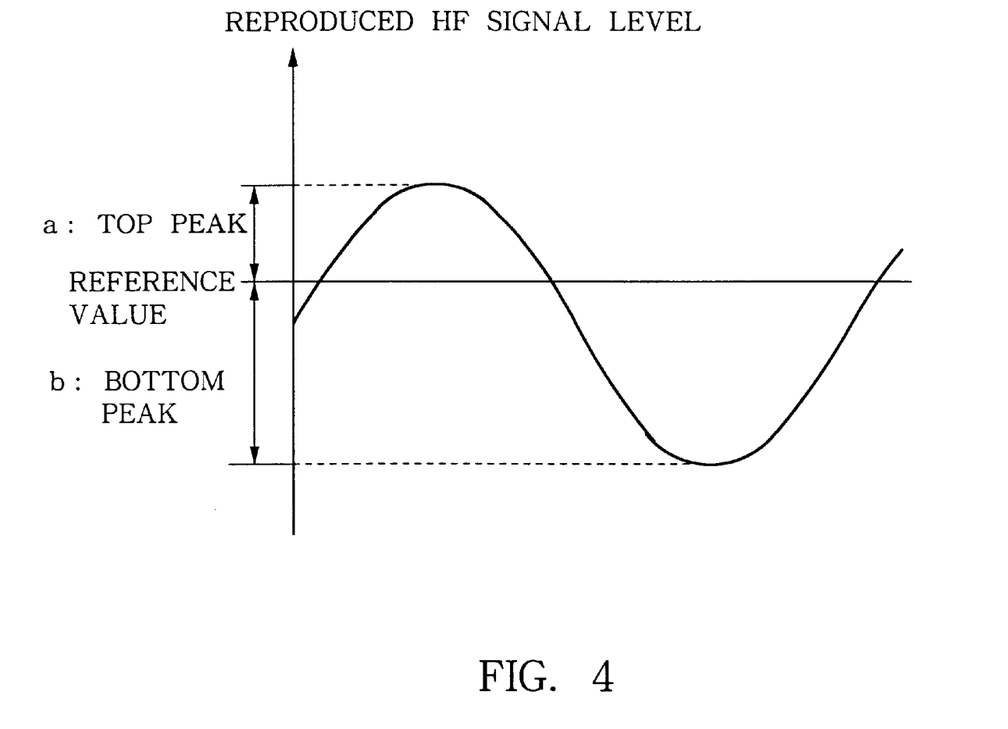
FIG. 4 is a diagram explanatory of a β value.

Once a desired recording speed has been selected or designated by the user operation on the speed setting page, the host computer 14 gives an instruction to the optical disk recording apparatus 10 to execute optimum power control (also known as OPC) at the selected recording speed, at step S21 of FIG. 3. In response to the instruction from the host computer 14, the optical disk recording apparatus 10 sets its recording speed to the user-designated speed at step S22 and then executes the optimum power control in accordance with an operational sequence preset for the apparatus 10, at step S23. The optimum power control may be carried out here in any conventionally-known manner, one example of which will be explained briefly hereinbelow. The optical disk recording apparatus 10 generates a test signal for the optimum power control operation by means of an OPC test signal generation circuit 44 of FIG. 1, and records the test signal onto a power calibration area (PCA) of the optical disk while sequentially changing the power level of the recording laser light beam 23 in on a step-by-step basis. Then, the recorded test signals are reproduced so as to measure parameter values pertaining to the quality of the reproduced signals corresponding to the various recording power levels. Examples of the parameter values measured here may include so-called β values of the reproduced high frequency (HF) signals, in the case of the CD–R or CD–RW disk. If top and bottom peak levels of the high frequency signal relative to a predetermined reference value are given as "a" and "b", respectively, as shown in FIG. 4, the β value can be calculated by $$\beta = (a-b)/(a+b)$$  Expression (1)

The examples of the parameter values may also include parameter values pertaining to the total number of detected frame synchronization signals within a predetermined time period. Table 1 below shows measures of the number of detected frame synchronization signals and β value of a CD–R disk, manufactured by a certain manufacturer and having a recording layer containing a cyanine-based dye, which were obtained, in relation to various recording power levels, by performing the optimum power while changing the power level of the recording laser light beam in 15 steps to record the test signals onto the optical disk and then reproducing the recorded test signals from the optical disk. In the table, "No.0" and "No. 14" represent highest and lowest laser power levels, respectively, and intervening "No. 1"–"No. 13" represent recording laser power levels between the highest and lowest laser power levels.

TABLE 1

| Recording Power | Number of Frame Sync. Signals | β value (%) |
|---|---|---|
| No. 0 | 77 | −13 |
| No. 1 | 79 | −290 |
| No. 2 | 91 | −287 |
| No. 3 | 98 | −247 |
| No. 4 | 94 | −214 |
| No. 5 | 96 | −151 |
| No. 6 | 97 | −121 |
| No. 7 | 94 | −73 |
| No. 8 | 97 | −20 |
| No. 9 | 94 | 44 |
| No. 10 | 94 | 119 |

TABLE 1-continued

| Recording Power | Number of Frame Sync. Signals | β value (%) |
|---|---|---|
| No. 11 | 98 | 176 |
| No. 12 | 93 | 245 |
| No. 13 | 84 | 315 |
| No. 14 | 31 | 363 |

Referring back to FIG. 1, a β value calculation circuit 46 calculates a β value for each of the recording laser power levels, on the basis of Expression (1) above, during reproduction of the signals recorded through the optimum power control (OPC) operation. In parallel with the β value calculation by the calculation circuit 46, a detection/counting circuit 48 detects and counts the total number of detected EFM frame synchronization signals for each of the recording power levels. Once the number of detected EFM frame synchronization signals and β value have been measured through the optimum power control operation for each of the recording power levels, the system controller 40, on the basis of the measured results, determines whether there is achieved any recording laser power level that can provide reproduced signal quality falling within an acceptable range (steps S24 and S25 of FIG. 3). More specifically, the determination at step S25 is made by ascertaining whether or not any of the recording laser power levels allows both of the number of detected EFM frame synchronization signals and β value to fall within their respective acceptable ranges. For example, the acceptable range for the number of detected EFM frame synchronization signals may be set to "70" or more, and the acceptable range for the β value may be set to −67±10%. Using such acceptable ranges, it can be seen that recording laser power level No. 7 in Table 1 achieves such reproduced signal quality falling within the acceptable range.

If there is achieved no recording power level that can provide reproduced signal quality falling within the acceptable range as determined at step S25, then the optimum power control operation is performed with the recording speed increase ratio lowered by one step, at step S26 of FIG. 3.

Figure 5C:
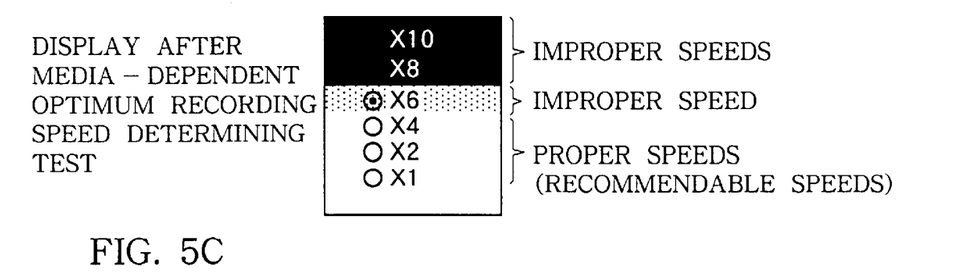
Figure 5D:
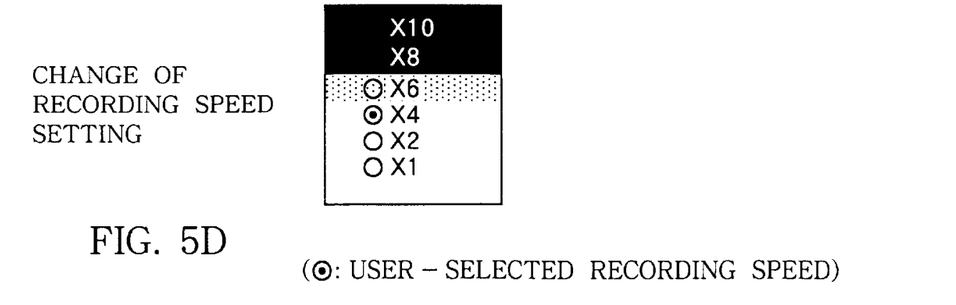

The optimum power control (OPC) operation is repeated by sequentially lowering the recording speed increase ratio on the step-by-step basis until a proper recording speed increase ratio is found which achieves a recording power level that can provide reproduced signal quality falling within the acceptable range. Once there has been found such a recording speed increase ratio achieving the recording power level that can provide reproduced signal quality falling within the acceptable range, the optimum power control operation is brought to an end, and the results of the optimum power control operation are transmitted to the host computer 14, in response to which the host computer 14 again opens the speed setting page at step S27. FIG. 5C shows an example of the speed setting page displayed at this step S27. On the basis of the display of FIG. 5C, it is determined that the six-times recording speed (×6) achieves no recording laser power level that can provide reproduced signal quality falling within the acceptable range and the quadruple recording speed (×4) achieves a recording power level that can provide reproduced signal quality falling within the acceptable range; thus, in FIG. 5C, the quadruple recording speed and other speeds lower than the same are being displayed as proper (or recommendable) speeds. If the recording speed initially selected by the user on the initial speed setting page is other than the recommendable speeds of FIG. 5C as determined at step S28 of FIG. 3, then a warning is displayed on the speed setting page at next step S29 in order to prompt the user to change the recording speed. FIG. 5D shows a situation where the user has changed the recording speed to the quadruple recording speed among the recommendable speeds in response to the displayed warning. Then, once the user depresses an OK (final speed selecting) button on the speed setting page, the optical disk recording apparatus 10 is set to the finally-selected recording speed so that actual recording is effected at step S30 after setting the drive to the finally-selected recording speed. Note that although the actual recording can be effected without regard to the warning, resultant recorded data will have poor reliability in such a case. Therefore, the optical disk recording apparatus 10 may be programmed so that no other recording speed than the recommendable speeds can be set as a speed for the actual recording.

Recording laser power level for the actual recording can be set on the basis of the β value measures obtained through the OPC operation in the media-dependent optimum recording speed determining test performed for the set recording speed; that is, the recording laser power level capable of providing the optimum β value is determined and set on the basis of the measures, for example, through linear interpolation. In the case where one of the recording speeds providing the results of Table 1 is to be set as the recording speed for the actual recording and if the optimum β value is −67%, the recording laser power level can be determined as a value between the Nos. 7 and 8 power levels through linear interpolation. As a consequence, the instant embodiment can eliminate a need for a separate OPC operation for determining an optimum recording laser power level as has heretofore been performed in the conventional optical disk recording apparatus.

As a modification of the present invention, the optical disk recording apparatus 10 may further include an optimum recording speed/power information generation circuit 50 that generates data indicative of the recommendable recording speeds obtained through the media-dependent optimum recording speed determining test and data indicative of recording power levels capable of providing optimum β values at the individual recommendable recording speeds, at an appropriate time point after completion of the media-dependent optimum recording speed determining test, and these data may be prestored as part of main data in a predetermined area, such as the PCA (Power Calibration Area) or PMA (Program Memory Area), of the optical disk 18. In this case, it is possible to eliminate the need for repetitively performing the media-dependent optimum recording speed determining test on the same optical disk 18, by reading out and displaying the prestored data when the optical disk 18 is re-loaded into the optical disk recording apparatus 10 on a next occasion so that the user can select and set one of the displayed recommendable recording speeds to thereby set the recording laser power level to a value capable of providing an optimum β value at that recording speed.

The preferred embodiment has been described above as sequentially repeating the media-dependent optimum recording speed determining test until a recording speed judged to be proper is found. However, a modification may be made such that results of the optimum power control are recorded at a time for all the recording speeds judged to be proper as a result of the system-dependent optimum recording speed determining test and the thus-recorded results are then reproduced simultaneously so that suitability/non-suitability of the recording speeds is determined by ascertaining, for each of the recording speeds, whether there is achieved any recording laser power level capable of providing reproduced signal quality falling within the acceptable range at that recording speed.

What is claimed is:

1. A method of determining an optimum recording speed of an optical disk, said method comprising the steps of:

performing test recording on the optical disk at a given recording speed while changing a recording laser power level, and reproducing results of the test recording from the optical disk; measuring parameter values pertaining to reproduced signal quality on the basis of the reproduced results; and determining, on the basis of the parameter values, whether there is achieved any laser power level that can provide reproduced signal quality falling within a predetermined acceptable range, wherein when it is determined that there is achieved the laser power level that can provide reproduced signal quality falling within the predetermined acceptable range, said given recording speed is judged as a proper recording speed, while when it is determined that there is achieved no laser power level that can provide reproduced signal quality falling within the predetermined acceptable range, said given recording speed is judged as an improper recording speed.

2. A method as claimed in claim 1 wherein said parameter values pertaining to reproduced signal quality include at least parameter values relating to a total number of detected synchronization signals within a predetermined time period and a ratio between top and bottom peaks of a reproduced HF signal, and wherein a recording speed achieving a laser power level that allows both of the parameter values relating to the total number of detected synchronization signals and the ratio between top and bottom peaks to fall within respective acceptable ranges is judged as a proper recording speed.

3. A method as claimed in claim 1 which further comprises the steps of:

causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus;

determining whether a buffer memory of said optical disk recording apparatus will cause buffer underrun during recording of the recording data, to thereby identify one or more recording speeds that can avoid the buffer underrun; and performing the test recording by use of one of the recording speeds that can avoid the buffer underrun.

4. An optical disk recording method wherein actual recording is performed on an optical disk at a recording speed that is set for use in the actual recording through the method as recited in claim 3, by, on the basis of the test recording, setting the recording laser power level to a value with which there has been provided reproduced signal quality within the predetermined acceptable range.

5. A method of setting a recording speed of an optical disk wherein one or more recording speeds judged as proper through the method recited in claim 1 is displayed in such a manner that one of the displayed recording speeds can be set for use in actual recording on the basis of a speed designating operation by a user.

6. A method of setting a recording speed of an optical disk wherein one or more recording speeds judged as proper through the method recited in claim 1 is stored onto a predetermined area of the optical disk, and wherein as the optical disk is re-loaded into an optical disk recording apparatus, information indicative of the recording speeds judged as proper is read out from the predetermined area and displayed in such a manner that one of the displayed recording speeds can be set for use in actual recording on the basis of a speed designating operation by a user without a need for performing the test recording again.

7. An optical disk recording method wherein actual recording is performed on an optical disk at a recording speed that is set for use in the actual recording through the method as recited in claim 1, by, on the basis of the test recording, setting the recording laser power level to a value with which there has been provided reproduced signal quality within the predetermined acceptable range.

8. A method of determining an optimum recording speed of an optical disk, said method comprising the steps of:

performing test recording on the optical disk while changing a recording speed and a recording laser power level, and reproducing results of the test recording from the optical disk;

measuring parameter values pertaining to reproduced signal quality on the basis of the reproduced results; and determining, on the basis of the parameter values, whether there is achieved any laser power level that can provide reproduced signal quality falling within a predetermined acceptable range, wherein a recording speed achieving the laser power level that can provide reproduced signal quality falling within the predetermined acceptable range is judged as a proper recording speed, while another recording speed achieving no laser power level that can provide reproduced signal quality falling within the predetermined acceptable range is judged as an improper recording speed.

9. A method as claimed in claim 8 wherein said parameter values pertaining to reproduced signal quality include at least parameter values relating to a total number of detected synchronization signals within a predetermined time period and a ratio between top and bottom peaks of a reproduced HF signal, and wherein a recording speed achieving a laser power level that allows both of the parameter values relating to the total number of detected synchronization signals and the ratio between top and bottom peaks to fall within respective acceptable ranges is judged as a proper recording speed.

10. A method as claimed in claim 8 which further comprises the steps of:

causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus;

determining whether a buffer memory of said optical disk recording apparatus will cause buffer underrun during recording of the recording data, to thereby identify one or more recording speeds that can avoid the buffer underrun; and performing the test recording by use of one of the recording speeds that can avoid the buffer underrun.

11. A method of setting a recording speed of an optical disk wherein one or more recording speeds judged as proper through the method recited in claim 8 is displayed in such a manner that one of the displayed recording speeds can be set for use in actual recording on the basis of a speed designating operation by a user.

12. A method of setting a recording speed of an optical disk wherein one or more recording speeds judged as proper through the method recited in claim 8 is stored onto a predetermined area of the optical disk, and wherein as the optical disk is re-loaded into an optical disk recording apparatus, information indicative of the recording speeds judged as proper is read out from the predetermined area and displayed in such a manner that one of the displayed recording speeds can be set for use in actual recording on the basis of a speed designating operation by a user without a need for performing the test recording again.

13. An optical disk recording method wherein actual recording is performed on an optical disk at a recording speed that is set for use in the actual recording through the method as recited in claim 8, by, on the basis of the test recording, setting the recording laser power level to a value with which there has been provided reproduced signal quality within the predetermined acceptable range.

14. A method of setting a recording speed of an optical disk, said method comprising:
   a step of performing test recording on the optical disk with a recording speed initially set to a maximum available speed while changing a recording laser power level, and reproducing results of the test recording from the optical disk;
   a step of measuring parameter values pertaining to reproduced signal quality on the basis of the reproduced results; a step of, when there is achieved a recording laser power level that can provide reproduced signal quality higher than a predetermined value, terminating the test recording at the recording speed, but when there is achieved no recording laser power level that can provide reproduced signal quality higher than the predetermined value, performing the test recording while sequentially lowering the recording speed and terminating the test recording at a recording speed that can provide reproduced signal quality higher than the predetermined value; and
   a step of displaying, as a recommendable or settable recording speed, each recording speed having been used at the time of termination of the test recording in such a manner that the displayed recording speed can be set for use in actual recording.

15. A method as claimed in claim 14 which further comprises the steps of:
   causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus;
   determining whether a buffer memory of said optical disk recording apparatus will cause buffer underrun during recording of the recording data, to thereby identify one or more recording speeds that can avoid the buffer underrun; and
   setting a highest one of the one or more recording speeds as said maximum available speed.

16. A method as claimed in claim 14 which further comprises a step of displaying a warning when it is determined, as a result of the test recording at the maximum available speed, that there is achieved no recording laser power level that can provide reproduced signal quality higher than the predetermined value.

17. An optical disk recording method wherein actual recording is performed on an optical disk at a recording speed that is set for use in the actual recording through the method as recited in claim 14, by, on the basis of the test recording, setting the recording laser power level to a value with which there has been provided reproduced signal quality within the predetermined acceptable range.

18. A method of setting a recording speed of an optical disk, said method comprising:
   a step of performing test recording on the optical disk with a recording speed initially set to a desired speed designated by a user operation while changing a recording laser power level, and reproducing results of the test recording from the optical disk;
   a step of measuring parameter values pertaining to reproduced signal quality on the basis of the reproduced results;
   a step of, when there is achieved a recording laser power level that can provide reproduced signal quality higher than a predetermined value, terminating the test recording at the recording speed, but when there is achieved no recording laser power level that can provide reproduced signal quality higher than the predetermined value, performing the test recording while sequentially lowering the recording speed and terminating the test recording at a recording speed that can provide reproduced signal quality higher than the predetermined value; and
   a step of displaying, as a recommendable or settable recording speed, each recording speed having been used at the time of termination of the test recording in such a manner that the displayed recording speed can be set for use in actual recording.

19. A method as claimed in claim 18 which further comprises the steps of:
   causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus; and
   determining whether a buffer memory of said optical disk recording apparatus will cause buffer underrun during recording of the recording data, to thereby identify one or more recording speeds that can avoid the buffer underrun,
   wherein the user is allowed to designate an initial recording speed for the test recording from among the recording speeds that can avoid the buffer underrun.

20. A method as claimed in claim 18 which further comprises a step of displaying a warning when it is determined, as a result of the test recording at the recording speed designated by the user, that there is achieved no recording laser power level that can provide reproduced signal quality higher than the predetermined value.

21. An optical disk recording method wherein actual recording is performed on an optical disk at a recording speed that is set for use in the actual recording through the method as recited in claim 18, by, on the basis of the test recording, setting the recording laser power level to a value with which there has been provided reproduce signal quality within the predetermined acceptable range.

22. A method of determining an optimum recording speed of an optical disk, comprising:
- performing test recording on the optical disk at a given recording speed while changing a recording laser power level, and reproducing results of the test recording from the optical disk;
- measuring a total number of detected synchronization signals within a predetermined time period as parameter values pertaining to reproduced signal quality based on the reproduced results; and
- determining, based on the total number of detected synchronization signals, whether there is achieved any laser power level that can provide the total number of detected synchronization signals falling within a predetermined acceptable range,
- wherein when it is determined that there is achieved the laser power level that can provide the total number of detected sychronization signals falling within the predetermined acceptable range, said given recording speed is judged as a proper recording speed, while when it is determined that there is achieved no laser power level that can provide the total number of detected synchronization signals falling within the predetermined acceptable range, said given recording speed is judged as an improper recording speed.

23. A method as claimed in claim 22, wherein said parameter values pertaining to reproduced signal quality include at least parameter values relating to a ratio between top and bottom peaks of a reproduced HF signal, and wherein a recording speed achieving a laser power level that allows both of the parameter values relating to the total number of detected sychronization signals and the ratio between top and bottom peaks to fall within respective acceptable ranges is judged as a proper recording speed.

24. A method as claimed in claim 22, further including:
- causing recording data to be transferred from a host computer to an optical disk recording apparatus so that said optical disk recording apparatus records the recording apparatus so that said optical disk recording apparatus level while changing a recording speed within a recording speed range settable in said optical disk recording apparatus;
- determining whether a buffer memory of said optical disk recording apparatus will cause buffer underrun during recording of the recording data, to thereby identify one or more recording speeds that can avoid the buffer underrun; and
- performing the test recording by use of one of the recording speeds that can avoid the buffer underrun.

25. A method of determining an optimum recording speed of an optical disk comprising:
- performing test recording on the optical disk while changing a recording speed and a recording laser power level, and reproducing results of the test recording from the optical disk;
- measuring a total number of detected synchronization signals within a predetermined time period as parameter values pertaining to reproduced signal quality based on the reproduced signal results; and
- determining, based on the total number of detected synchronization signals, whether there is achieved any laser power level that can provide the total number of detected synchronization signals falling within a predetermined acceptable range,
- wherein a recording speed achieving the laser power level that can provide the total number of detached synchronization signals falling within the predetermined acceptable range is judged as a proper recording speed, while another recording speed achieving no laser power level that can provide the total number of detected synchronization signals falling within the predetermined acceptable range is judged as an improper recording speed.

26. A method of determining an optimum recording speed of an optical disk, comprising:
- performing test recording on the optical disk at a given recording speed while changing a recording laser power level, and reproducing results of the thest recording from the optical disk;
- measuring parameter values pertaining to reproduced signal quality based on the reproduced results; and
- determining, based on the parameter values, whether there is achieved any laser power level that can provide reproduced signal quality falling within a predetermined acceptable range,
- wherein when it is determined that there is achieved the laser power level that can provide reproduced signal quality falling within the predetermined acceptable range, said given recording speed is judged as an improper recording speed,
- said method further including:
  - causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus,
- determining whether a buffer memory of said optical disk recording apparatus will cause buffer underrun during recording of the recording data, to thereby identify one or more recording speeds that can avoid the buffer underrun, and
- performing the test recording by use of one of the recording speeds that can avoid the buffer underrun.

27. A method as claimed in claim 26, wherein said parameter values pertaining to reproduced signal quality include at least parameter values relating to a total number of detected synchronization signals within a predetermined time period and a ratio between top and bottom peaks of a reproduced HF signal, and wherein a recording speed achieving a laser power level that allows both of the parameter values relating to the total number of detected synchronization signals and the ratio between top and bottom peaks to fall within respective acceptable ranges is judged as a proper recording speed.

28. A method of determining an optimum recording speed of an optical disk, comprising:
- performing test recording on the optical disk while changing a recording speed and a recording laser power level, and reproducing results of the test recording from the optical disk;
- measuring parameter values pertaining to reproduced signal quality based on the reproduced results; and
- determining, based on the parameter values, whether there is achieved any laser power level that can provide reproduced signal quality falling within a predetermined acceptable range,
- wherein a recording speed achieving the laser power level that can provide reproduced signal quality falling within the predetermined acceptable range is judged as a proper recording speed, while another recording speed achieving no laser power level that can provide reproduced signal quality falling within the predetermined acceptable range is judged as an improper recording speed, said method further including:

causing recording data to be transferred from a host computer to an optical disk recording apparatus so that said optical disk recording apparatus records the recording data onto the optical disk with a reproducing laser power level while changing a recording speed within a recording speed range settable in said optical disk recording apparatus, determining whether a buffer memory of said optical disk recording apparatus will cause buffer underrun during recording of the recording data, to thereby identify one or more recording speeds that can avoid the buffer underrun, and performing the test recording by use of one of the recording speeds that can avoid the buffer underrun.

29. A method of setting a recording speed of an optical disk, comprising:

performing test recording on the optical disk at a given recording speed while changing a recording laser power level, and reproducing results of the test recording from the optical disk;

measuring parameter values pertaining to reproduced signal quality based on the reproduced results; and determining, based on the parameter values, whether there is achieved any laser power level that can provide reproduced signal quality falling within a predetermined acceptable range, wherein when it is determined that there is achieved the laser power level that can provide reproduced signal quality falling within the predetermined acceptable range, said given recording speed is judged as a proper recording speed, while when it is determined that there is achieved no laser power level that can provide reproduced signal quality falling within the predetermined acceptable range, said given recording speed is judged as an improper recording speed, and one or more recording speeds judged as proper is displayed in such a manner that one of the displayed recording speeds can be set for use in actual recording based on a speed designating operation by a user.

30. A method of setting a recording speed of an optical disk, comprising:

performing test recording on the optical disk while changing a recording speed and a recording laser power level, and reproducing results of the test recording from the optical disk;

measuring parameter values pertaining to reproduced signal quality based on the reproduced results; and determining, based on the parameter values, whether there is achieved any laser power level that can provide reproduced signal quality falling within a predetermined acceptable range, wherein a recording speed achieving the laser power level that can provide reproduced signal quality falling within the predetermined acceptable range is judged as a proper recording speed, while another recording speed achieving no laser power level that can provide reproduced signal quality falling within the predetermined acceptable range is judged as an improper recording speed, and one or more recording speeds judged as proper is displayed in such a manner that one of the displayed recording speeds can be set for use in actual recording based on a speed designating operation by a user.

31. A method of setting a recording speed of an optical disk, comprising:

performing test recording on the optical disk at a given recording speed while changing a recording laser power level, adn reproducing results of the test recording from the optical disk;

measuring parameter values pertaining to reproduced signal quality based on the reproduced results; and determining, based on the parameter values, whether there is achieved any laser power level that can provide reproduced signal quality falling within a predetermined acceptable range, wherein when it is determined that there is achieved the laser power level that can provide reproduced signal quality falling within the predetermined acceptable range, said given recording speed is judged as a proper recording speed, while when it is determined that there is achieved no laser power level that can provide reproduced signal quality falling within the predetermined acceptable range, said given recording speed is judged as an improper recording speed, and one or more recording speeds judged as proper is stored onto a predetermined area of the optical disk, and wherein as the optical disk is re- loaded into an optical disk recording apparatus, information indicative of the recording speeds judged as proper is read out from the predetermined area and displayed in such a manner that one of the displayed recording speeds can be set for use in actual recording based on a speed designating operation by a user without a need for performing the test recording again.

32. A method of setting a recording speed of an optical disk, comprising:

performing test recording on the optical disk while changing a recording speed and a recording laser power level, and reproducing results of the test recording from the optical disk;

measuring parameter values pertaining to reproduced signal quality based on the reproduced results; and determining, based on the parameter values, whether there is achieved any laser power level that can provide reproduced signal quality falling within a predetermined acceptable range, wherein a recording speed achieving the laser power level that can provide reproduced signal quality falling within the predetermined acceptable range is judged as a proper recording speed, while another recording speed achieving no laser power level that can provide reproduced signal quality falling within the predetermined acceptable range is judged as an improper recording speed, and one or more recording speeds judged as proper is stored onto a predetermined area of the optical disk, and wherein as the optical disk is re-loaded into an optical disk recording apparatus, information indicative of the recording speeds judged as proper is read out from the predetermined area and displayed in such a manner that one of the displayed recording speeds can be set for use in actual recording based on a speed designating operation by a user without a need for performing the test recording again.

* * * * *